United States Patent [19]

Springman

[11] Patent Number: 4,930,620
[45] Date of Patent: Jun. 5, 1990

[54] ARTICLE CARRYING MEMBER FOR CONVEYOR CHAIN

[75] Inventor: Charles G. Springman, Beech Grove, Ind.

[73] Assignee: AMSTED Industries, Incorporated, Chicago, Ill.

[21] Appl. No.: 349,816

[22] Filed: May 10, 1989

[51] Int. Cl.$^5$ .............................................. B65G 17/12
[52] U.S. Cl. ........................... 198/803.01; 198/803.12
[58] Field of Search .............. 198/719, 803.01, 803.12, 198/487.1, 733, 731; 403/41, 302, 309, 313, 290

[56] References Cited

U.S. PATENT DOCUMENTS

| | | | |
|---|---|---|---|
| 425,787 | 4/1890 | Hartshorn | 403/313 |
| 2,640,719 | 6/1953 | Dennington, Jr. | 403/313 |
| 2,913,791 | 11/1959 | Martin | 403/41 X |
| 2,943,876 | 7/1960 | Morris | 403/313 |
| 3,256,048 | 6/1966 | Rea | 403/41 X |
| 4,129,206 | 12/1978 | Talbott | 198/803.12 X |
| 4,388,990 | 6/1983 | Michalik | 198/803.01 |
| 4,501,351 | 2/1985 | Tracy | 198/803.01 |

FOREIGN PATENT DOCUMENTS 319000  1/1957  Switzerland ................... 403/313

*Primary Examiner*—Robert J. Spar
*Assistant Examiner*—D. Glenn Dayoan
*Attorney, Agent, or Firm*—Charles E. Bouton; Edward J. Brosius

[57] ABSTRACT

A conveyor chain and an article carrying member extending from a chain link pin wherein the carrying member comprises a rod aligned and abutted to a link pin and secured thereto by a fracturable split sleeve and a compression washer pressed on the outside of the sleeve.

11 Claims, 1 Drawing Sheet

ARTICLE CARRYING MEMBER FOR CONVEYOR CHAIN

This invention relates to an improved article carrying member detachably secured to a conveyor chain and more particularly relates to a construction of such carrying member alone and in combination with a conveyor chain enabling breakaway of a carrying member without damage to the chain.

BACKGROUND OF THE INVENTION

Conveyor chains with one or more article carrying members are well known in the prior art. For examples: Lynch U.S. Pat. No. 1,707,088 shows solid cylindrical rods extending to one side of successive roller chain links with each rod having a reduced shank in the form of a pintle that acts as a link pin in the chain; Talbott U.S. Pat. 4,129,206 shows a similar link pin and rod with a scored sleeve, for receiving an empty can, extending outward of a hub rotatably mounted on the rod; Tracy U.S. Pat. No. 4,501,351 shows similar rods extending to one side of occasional special roller chain links wherein each rod pintle is plugged into a hollow link pin and the rod is coupled to an adjacent extended regular link pin by a supplemental link plate that is fastened substantially flush against an interconnected regular outer pin link plate by a cotter pin through the regular link pin; and Michalik U.S. Pat. No. 4,388,990 shows a modified roller chain wherein each link pin extends uniformly beyond the outer pin link plate to one side of the chain and solid cylindrical extension rods are connected to and aligned with occasional pins by means of split sleeves or bushings which will open to release the extension rods should an obstruction occur in the conveyor path. There is also a known commercially available variation of the Tracy patent structure (produced by a division of the patent assignee, Incom International Inc.) wherein the pintle is eliminated and a hollow rod is press fitted to the end of one extended regular link pin and coupled to an adjacent extended link pin by a cotter pin and a supplemental link plate that is mounted flush with the rod end.

A disadvantage of the aforedescribed prior art, with the exception of the Michalik patent, is that the rods, which are spaced in accordance with the particular conveyor installation to carry items suspended to one side of a single chain conveyor, are made essentially integral with the chain and risk damage to the chain, such as a chain break or detachment from the chain drive, should something obstruct movement of the rods or articles carried thereby. Since these chains are usually utilized to transport articles between and through processing stations, such obstructions do occur; and additionally significant routine forces are imparted to the rods at the processing stations. In the Talbott patent structure the sleeve is weakened to break free outwardly of the supporting rod but the chain is not fully protected thereby. While the structure of the Michalik patent overcomes, to a degree, the risk of chain damage, it involves a significant risk that the split sleeve will open to release the carrying rod when subjected to routine processing forces or that it will gradually allow the rod to slip away during repeated cycles through processing operations. The latter risk is further increased if there is even a slight difference between the cross sections of the link pin and an extension rod aligned therewith because one will tend to hold open the split sleeve respecting the other. The present invention overcomes the deficiencies of the structure described by Michalik.

SUMMARY OF THE INVENTION

Accordingly it is a principal object of the present invention to provide an improved article carrying member for a conveyor chain that will readily detach without damage to the chain if subjected to unusual forces yet will not detach due to repeated routine forces.

Another object of the present invention is to provide an article carrying member and means for detachably connecting it to a conveyor chain link pin which means will compensate for differences in the cross section of the connected parts.

A further object of the present invention is to provide conveyor chain with an article carrying member connected to a chain link pin by means which will compensate for differences in the cross sections of the connected parts.

Briefly stated the invention comprises a carrying member for a roller chain with at least some link pins that extend a short distance beyond the outer pin link plates to one side of the chain, wherein the carrying member has at least one extension rod aligned with a link pin and connected thereto by a fracturable split sleeve which sleeve is telescoped over both the rod and pin with a compression member applied to close the split sleeve on both parts.

BRIEF DESCRIPTION OF THE DRAWINGS

Further objects and advantages will become apparent upon reading the following detailed description of the present invention in conjunction with the accompanying drawing wherein.

DETAILED DESCRIPTION OF THE INVENTION

Figure 1:
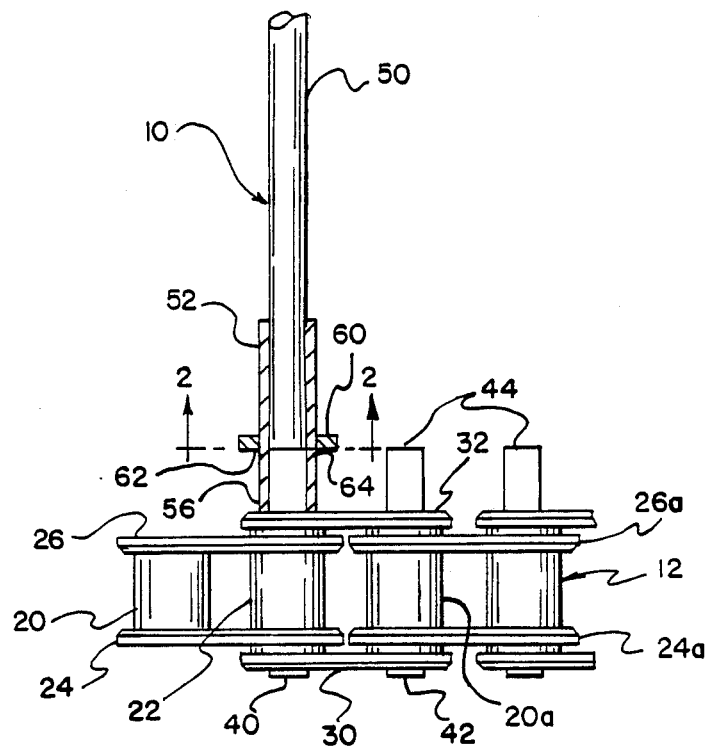
FIG. 1 is a plan view of a preferred embodiment of the invention with an article carrying member shown mounted to a link pin projecting to one side of a roller chain.
Figure 2:
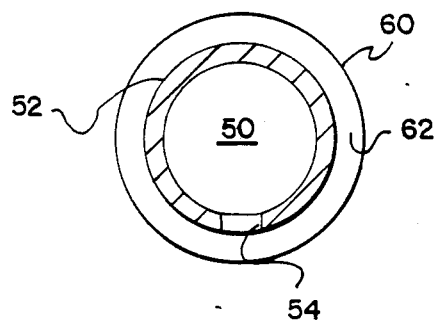
FIG. 2 is a sectional view taken at line 2—2 in FIG. 1.

In FIG. 1 it will be seen that an article carrying member generally 10 extends to one side of an essentially standard form of conveyor chain generally 12. The conveyor chain 12 comprises a plurality of sets of paired rollers 20, 22 rotatably supported on bushings or the like (not shown) between roller link plates 24, 26 with successive adjacent roller sets interconnected by outer pin link plates 30, 32 and link pins 40, 42. As is well understood the link pins 40, 42 extend coaxially with rollers and holes (not shown) in successive pairs of roller link plates 24, 26 and 24a, 26a and through holes (not shown) in the outer pin link plates 30, 32. In the preferred conveyor configuration each link pin has an extended end 44 that projects a short distance beyond the respective pin link plate 32, which distance is sufficient to receive the carrying member 10 as hereafter described. The projection distance will, of course, vary with the size of the chain, but a distance of about one four tenths (0.4) inch is usually adequate for chain sized to have a pitch of about three quarters (0.75) of an inch.

The preferred carrying member 10 comprises a cylindrical extension rod 50, which may be either solid or hollow, having an outer dimension and cross section substantially the same as the projecting end 44 of a link pin 40 to which it is to be aligned and mounted. A split sleeve or bushing 52 having a longitudinal opening 54 and a normal internal dimension slightly less than the outer diameter of the link pin 40 is pressed onto the projecting end 44 thereof and telescoped thereover until a sleeve end 56 abuts the pin link plate 32. The split sleeve 52 must be of a length greater than the distance the link pin end 44 extends from the pin link plate 32 and sufficient to grip and retain an end of the extension rod 50. Preferably the sleeve 52 length is more than twice the extension of pin end 44 and optimally is about three times that distance so as to receive a relatively greater length of extension rod 50. As seen in FIG. 1, the rod 50 is pressed into the sleeve 52 so as to abut the end 44 of link pin 40.

The longitudinal opening 54 in sleeve 52 may be randomly oriented, that is there is no preferred position with respect to the direction of conveyor travel as it is intended that the split sleeve 52 not act to open and thereby separate from the link pin 40 when an excessive force is applied to the extension rod 50. Instead, according to the present invention, the split sleeve 52 includes a compression means that functions to urge the longitudinal opening 54 to close toward both ends and thereby compress upon both a link pin end 44 and an end of extension rod 50 even where either part may differ slightly in diameter or be slightly out of round. The compression means may take the form of an encircling washer 60 that is pressed onto the outer surface of split sleeve 52 and positioned at about the juncture of pin end 44 and rod 50. Preferably the washer 60 is positioned with one face 62 at the plane of the link pin end 44 and with the body of the washer encircling the end of rod 50.

The split sleeve 52 is a low cost coupling device and the longitudinal opening 54 therein functions mainly to permit telescoping onto both the link pin 40 and extension rod 50. The sleeve is designed to fracture so as to permit detachment of the extension rod from the link pin end 44. To accomplish this the sleeve may be fabricated from a relatively brittle material, such as carburized steel, and/or it may have an encircling score 64 on the outer surface thereof. Where a weakening score 64 is utilized, it is preferably located adjacent the face 62 of washer 60 so that any detachment fracture will occur at the plane of juncture between pin end 44 and rod 50. Should such detachment occur a carrying member 10 may be readily replaced after first extracting the part of a split sleeve 52 that may remain on a link pin end 44.

Obviously the conveyor chain generally 12 may have any appropriate member and spacing of the aforedescribed carrying member 10, particularly if all link pins 40, 42 throughout the conveyor have uniformly extended ends 44. However, it is possible to employ a single extended pin in each pair sharing pin link plates 30, 32 or even to employ extended pins at only those points appropriately spaced in a given application.

Moreover, the extension rod 50 may be modified to include a variety of shapes, such as a hook or funnel, or appendages, such as clamps or grommets, outward of the rod end that telescopes within the split sleeve 52.

Other alterations and modifications may be made without departing from the spirit and scope of the present invention which is defined in the following claims:

What is claimed is:

1. An article carrying member for mounting to a link pin end protruding from a roller type conveyor, said member comprising:
   a rod;
   a fracturable split sleeve telescoped upon an end of said rod with a portion of said sleeve extending beyond said rod to receive said link pin end;
   and a single washer encircling said split sleeve adjacent said rod end to compress said sleeve on both said rod and said pin and not open and separate therefrom except by fracture of said sleeve.

2. The article carrying member of claim 1 wherein said split sleeve is composed of a material that is brittle.

3. The article carrying member of claim 1 wherein said split sleeve includes an encircling score.

4. The article carrying member of claim 1 wherein said split sleeve includes an encircling score adjacent said washer.

5. A chain conveyor having an article carrying member wherein the chain conveyor includes rollers on link pins which extend to pin link plates outward of said rollers and said article carrying member extends outwardly thereof, the improvement comprising,
   at least one link pin having an end protruding beyond a pin link plate;
   a rod aligned with said link pin;
   a fracturable split sleeve telescoped upon an end of said rod and said end of said link pin with said ends abutting one another at a plane within said sleeve;
   and a single washer encircling said split sleeve to one side of said plane at the juncture of said rod and pin to compress said sleeve on both said rod and said pin and not open and separate therefrom except by fracture of said sleeve.

6. The chain conveyor of claim 5 wherein said split sleeve abuts said pin link plate.

7. The chain conveyor of claim 6 wherein said sleeve is of a length more than twice the distance that said link pin protrudes from said pin link plate.

8. The chain conveyor of claim 5 wherein said washer encircles the end of said rod and said washer includes a face positioned at said plane.

9. The chain conveyor of claim 5 including a score encircling said sleeve adjacent said washer.

10. The chain conveyor of claim 5 wherein said split sleeve is composed of a material that is brittle.

11. The chain conveyor of claim 5 wherein said split sleeve includes an encircling score.

* * * * *